United States Patent

[11] 3,566,227

[72] Inventor Arthur J. Edhlund
 Town of May, Minn.
[21] Appl. No. 822,200
[22] Filed May 6, 1969
[45] Patented Feb. 23, 1971
[73] Assignee Minnesota Mining and Manufacturing Company
 Saint Paul, Minn.

[54] SWITCHING CIRCUIT FOR OPERATION AND DYNAMIC BRAKING OF A DC MOTOR
 2 Claims, 1 Drawing Fig.
[52] U.S. Cl. .................................................. 318/258, 318/261, 318/380
[51] Int. Cl. ........................................................ H02p 3/12
[50] Field of Search ............................................ 318/258, 261, 379, 380

[56] References Cited
 UNITED STATES PATENTS
 3,371,259 2/1968 James et al. .................. 318/380
 3,378,740 4/1968 Cruel ............................ 318/380
 3,463,991 8/1969 Yuminaka et al. ............ 318/258

Primary Examiner—Oris L. Rader
Assistant Examiner—K. L. Crosson
Attorney—Kinney, Alexander, Sell, Steldt and Delahunt ABSTRACT: A switching circuit for controlling the operation of a DC motor or the dynamic braking of the motor, having driving circuits for selectively driving the motor in different directions when selectively connected to a direct current source and having dynamic braking circuits for connection to the motor armature winding, which dynamic braking circuits include solid-state switching devices which respond to a directional coasting of an undriven armature to complete a dynamic braking circuit to dynamically brake the motor. The dynamic braking-circuit switching devices are inhibited by means included in the driving circuits from completing the dynamic braking circuit while the motor is being driven.

PATENTED FEB 23 1971
3,566,227
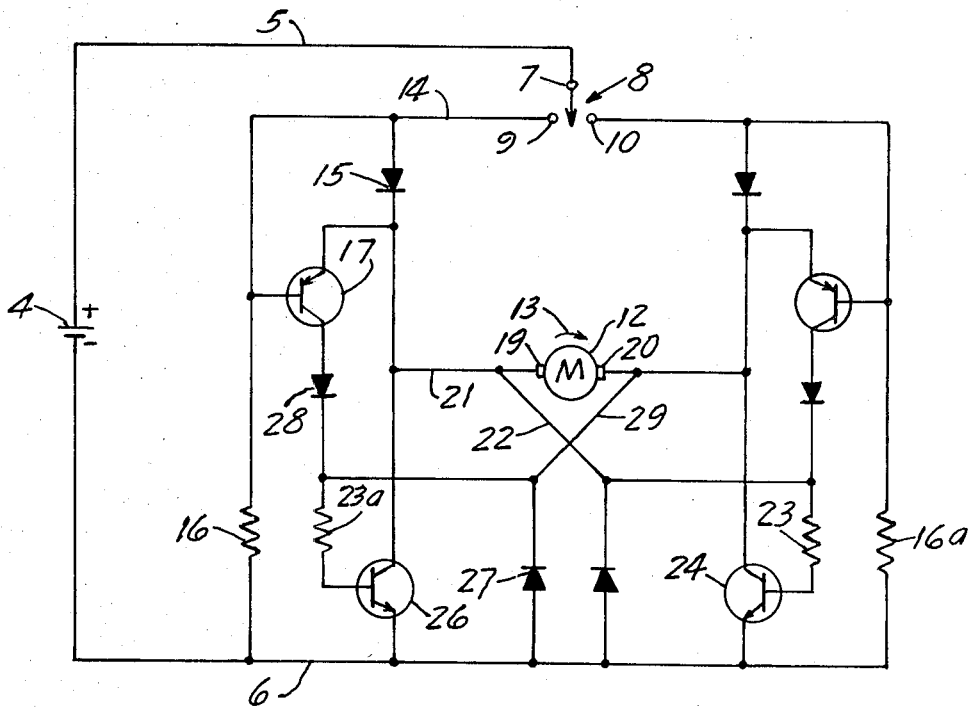
INVENTOR.
ARTHUR J. EDHLUND
BY Kinney, Alexander,
Sell, Steldt & De La Hunt
ATTORNEYS 3,566,227

SWITCHING CIRCUIT FOR OPERATION AND DYNAMIC BRAKING OF A DC MOTOR

BACKGROUND OF THE INVENTION

This invention relates to a switching circuit for a DC motor for selectively operating the motor in either direction by reversing the armature voltage and including circuit means for providing a dynamic breaking circuit, such as a low impedance path for the current induced by the coasting armature when the driving circuit is open, such that the motor is dynamically braked to a stop.

The principle of dynamic braking-to-stop direct current motors by removing applied voltage and providing a low impedance path for the current induced in the coasting armature is well known. In unidirectional applications the switching is also very straight forward. In applications however where it is desired to run the motor in either direction, the prior art has resorted to cumbersome multicontact dual-polarity switches or relays or dual-polarity power supplies.

SUMMARY OF THE INVENTION

The present invention affords a switching circuit, for selectively controlling a direct current motor including driving circuit for running the motor in a given direction and a dynamic breaking circuit for dynamically breaking the motor, wherein the dynamic braking circuit is completed by switching means which are responsive to a directional coasting of an undriven armature.

In accordance with the present invention, it is possible to control direct current motors to run in either direction and to be rapidly stopped without the cumbersome multicontact dual-polarity switches or relays or dual-polarity power supplies utilized by the prior art.

The switching circuit of the present invention operates from a source of direct current. A pair of driving circuits are connected to each terminal of a direct current motor for driving motor in one direction or the other. Each of the driving circuits include switching means which complete the circuit from one side of a DC source through the motor and back to the source of direct current. Dynamic braking circuits are disposed in generally parallel relationship with the armature terminals of the motor to afford a closed loop current path for the armature current when the driving circuits are opened to enable dynamic braking.

Each dynamic braking circuit includes switching means, the switching means of one braking circuit being responsive to electrical energy generated by the armature coasting in the forward direction for completing a current path across the armature, and the switching means of the other dynamic braking circuit being similarly responsive to energy generated by the armature coasting in the reverse direction.

BRIEF DESCRIPTION OF THE DRAWING

The drawing illustrates a schematic circuit diagram of the switching circuit constructed in accordance with the present invention.

DESCRIPTION OF THE PREFERRED EMBODIMENT

The motor switching circuit of the present invention is adapted to drive DC motors, having motor field magnetic flux supplied by permanent magnets or energized field windings, in a manner to drive the motor in either direction and to brake the motor. The present invention provides the bidirectional switching circuit to drive the current through the armature winding in either direction. The preferred switching means of the driving circuits and of the dynamic braking circuits are solid-state switching devices.

Referring to the drawing, a source of direct current 4, in the form of a battery, is connected through its two terminals to two leads 5 and 6. The lead 5 is connected to the single-pole terminal 7 of a single-pole double-throw selector switch 8 having lead terminals 9 and 10 for forward and reverse positions respectively. The single-pole double-throw selector switch 8 affords a means for energizing circuits to drive the motor 12 in either forward or reverse direction.

The switching circuit of the present invention includes a pair of symmetrical driving circuits each connected to a lead terminal of the switch 8 and to an armature terminal of the motor for placing the DC voltage across the armature winding to drive the motor in both forward and reverse directions. To effectively drive the motor, of course, the drive circuits must be closed back to the supply 4 through conductor 6. Switching means are included in the driving circuits such that in either the forward or the reverse operating position of the switch 8 the motor is energized and the circuit is closed to the source of direct current.

Dynamic braking circuits which are disposed in generally parallel circuit relationship to the armature winding of the motor are provided such that upon opening the switch 8 to a stop position after having driven the motor in either direction, the coasting armature will act as a generator providing an induced current which is conducted through a dynamic braking circuit across the armature terminals to dynamically brake the motor.

To describe the circuit, assume that a motor 12 has permanent field magnets and it is desired that the motor 12 run in the forward direction such as the direction of the arrow 13. The selector switch 8 is operated to move the switch blade to make contact between pole 7 and terminal 9. A current path is thereby established from the power supply 4 through the conductor 5 through switch 8 and through a lead 14. Current is then supplied through the diode 15, creating a voltage drop across diode 15. The voltage drop across the diode 15 places a reverse bias on the base-emitter junction of a PNP transistor 17, thereby preventing current flow through the transistor 17, thereby holding open the switching means in a first braking circuit of which the transistor 17 is a part, as will hereinafter be described, thereby inhibiting the operation of this first dynamic braking circuit. The current path is continued from diode 15 toward a first terminal 19 of the motor 12 through a first lead 21 which has a junction ahead of the terminal 19 where the current divides. A major portion of the current passes through the armature winding of the motor 12 causing it to rotate in the forward direction 13, but a minor portion of the current moves through a branch circuit, which includes conductor 22, resistor 23, and a first driving circuit switching means, NPN transistor 24. The current moves through conductor 22 to the resistor 23 and through the base-emitter junction of the NPN transistor 24. The current passing through the base-emitter junction places the transistor 24 in conducting condition thereby permitting the major portion of the current passing through the armature winding of the motor 12 to flow through the collector and the emitter of the transistor 24 to the conductor 6, to close the circuit to the power source 4. This switching means 24 is a part of the first driving circuit to drive the motor 12 in the forward direction 13. A similar symmetrical second driving circuit including switching means such as an NPN transistor 26 completes a circuit through the lead terminal 10 of the switch 8 to armature terminal 20 through the armature winding and from armature terminal 19 through NPN transistor 26 and conductor 6 to the source to drive the motor 12 in the reverse direction, opposite to arrow 13, when the selector switch 8 is moved to the reverse position.

When it is desired to stop the armature from further rotation in the forward direction of the arrow 13, the switch 8 is opened to the stop position, thereby breaking connection between the pole 7 and terminal 9. At that moment the power from the source is interrupted and the armature coasts due to its inertia, thus generating a voltage at the armature terminals 19 and 20 of the same polarity as the voltage immediately previously applied from the source but with opposite current flow. The first dynamic braking circuit now provides a path for the armature current from the armature terminal 19 through the conductor 21 and through the transistor 17, since conduction by the transistor 17 is no longer prevented by the reverse bias provided by the voltage drop across diode 15. A minor portion of the current flows from the emitter to the base of the transistor 17 and through the resistor 16. The current through resistor 16 flows through conductor 6 to the anode of a diode 27 to the terminal 20 of the motor. The current from the emitter to base of the transistor 17 places the transistor 17 in conducting condition thereby allowing a current flow from the armature terminal 19, through the lead 21, through the emitter and the collector of the transistor 17, and through a diode 28 and a lead 29 directly to the terminal 20. The current path through transistor 17 (emitter to collector) and through the diode 28 provides a low impedance path for the armature current of the motor 12 as is required to afford effective dynamic braking. The braking effect is controlled by the value of the resistor 16 and the direct current gain of transistor 17. Diode 28 protects PNP transistor 17 from the effects of collector to base reverse current.

In the preferred embodiment, the driving circuits and the dynamic braking circuits are symmetrical. Therefore, the other half of the switching circuit will not be described in detail as it would be merely repetitious.

In the preferred embodiment, the components are selected to have the following listed identities and values for switching a Barber Coleman model BYQM 3267 DC motor rated at 24 volts and 100 ma. and having an armature winding having a resistance of approximately 300 ohms.

| NPN Transistors | 2 N 4238 |
|---|---|
| PNP Transistors | 2 N 4235 |
| All Diodes | 1 N 5059 |
| Resistors 16 and 16a | 270 Ω, ½ watt |
| Resistors 23 and 23a | 560 Ω, ¼ watt |

Larger motors may be switched and braked by using transistors and diodes having higher current ratings. The braking circuit switching means and driving circuit switching means may be adapted for substitution of other solid-state switching devices, such as thyristors, for the transistors described herein.

I claim:
1. A switching circuit for selectively controlling the operation and dynamic braking of a direct current motor having first and second armature terminals, comprising:
   a driving circuit for connecting a direct current power source across said first and second armature terminals of said motor to drive said motor in a forward direction, which driving circuit comprises;
   a first diode having an anode for connection to a positive side of said direct current power source and a cathode for connection to said first armature terminal,
   a NPN transistor having a collector for connection to said second armature terminal and an emitter for connection to a negative side of said direct current power source, and
   a resistor connected between the base of the NPN transistor and the cathode of the first diode.
   whereupon, when the first diode cathode is connected to said first armature terminal and the NPN transistor collector is connected to said second armature terminal and the NPN transistor emitter is connected to said negative side of said direct current power source, the connection of the first diode anode to said positive said of said direct current power source enables the NPN transistor to conduct thereby completing the driving circuit to drive said motor in said forward direction, and
   a dynamic braking circuit for connection across said armature terminals of said motor to dynamically brake said driven motor upon the driving circuit being opened so that said armature is coasting in said forward direction, which dynamic braking circuit comprises;
   a PNP transistor having an emitter connected to the cathode of the first diode, having a base connected to the anode of the first diode, and having a collector operatively connected to the collector of the NPN transistor.
   a second diode having a cathode connected to the collector of the NPN transistor, and
   a second resistor connected between the base of the PNP transistor and the anode of the second diode,
   whereupon, when the driving circuit is connected to said direct current power source and to said armature terminals and said motor is being driven in said forward direction, the opening of the driving circuit by disconnecting the anode of the first diode from said positive side of said direct current power source to terminate conduction in the NPN transistor thereby causes the armature to coast in the forward direction to generate electrical energy and also thereby enables the PNP transistor to conduct in response to said generated electrical energy to complete the dynamic braking circuit across said first and second armature terminals.

2. A switching circuit according to claim 1 for selectively controlling the direction of operation and dynamic braking of a direct current motor, further comprising:
   a second driving circuit for connecting said direct current power source across said first and second armature terminals of said motor to drive said motor in a reverse direction, which driving circuit comprises:
   a third diode having an anode for connection to said positive side of said direct current power source and a cathode for connection to said second armature terminal,
   a second NPN transistor having a collector for connection to said first armature terminal and an emitter for connection to said negative side of said direct current power source, and
   a third resistor connected between the base of the second NPN transistor and the cathode of the third diode,
   whereupon, when the third diode cathode is connected to said second armature terminal and the second NPN transistor collector is connected to said first armature terminal and the second NPN transistor emitter is connected to said negative side of said direct current power source, the connection of the third diode anode to said positive side of said direct current power source enables the second NPN transistor to conduct thereby completing the second driving circuit to drive said motor in said reverse direction: and
   a second dynamic braking circuit for connection across said armature terminals of said motor to dynamically brake said driven motor upon the second driving circuit being opened so that said armature is coasting in the reverse direction, which second dynamic braking circuit comprises:
   a second PNP transistor having an emitter connected to the cathode of the third diode and having a base connected to the anode of the third diode,
   a fourth diode having an anode connected to the collector of the second PNP transistor and a cathode connected to the collector of the second NPN transistor,
   a fifth diode having a cathode connected to the collector of the second NPN transistor, and
   a fourth resistor connected between the base of the second PNP transistor and the anode of the fifth diode,
   whereupon when the second driving circuit is connected to said direct current power source and to said armature terminals and said motor is being driven in said reverse direction, the opening of the second driving circuit by disconnecting the anode of the third diode from said positive side of said direct current power source to terminate conduction in the second NPN transistor thereby causes the armature to coast in the reverse direction to generate electrical energy and also thereby enables the second PNP transistor to conduct in response to said generated electrical energy to complete the second dynamic braking circuit across said first and second armature terminals; and the dynamic braking circuit according to claim 1 further comprises a sixth diode having an anode connected to the collector of the PNP transistor and a cathode connected to the collector of the NPN transistor.